United States Patent [19]
Mori et al.

[11] Patent Number: 4,977,664
[45] Date of Patent: Dec. 18, 1990

[54] PROCESSING APPARATUS FOR PLAIN BEARINGS

[75] Inventors: Sanae Mori; Kosaburo Niwa, both of Nogoya, Japan

[73] Assignee: Daido Metal Company Ltd., Nagoya, Japan

[21] Appl. No.: 395,166

[22] Filed: Aug. 17, 1989

Related U.S. Application Data

[63] Continuation of Ser. No. 230,011, Aug. 8, 1988, abandoned.

[30] Foreign Application Priority Data

Aug. 21, 1987 [JP] Japan .................. 62-207812

[51] Int. Cl.$^5$ ............................. B23Q 7/02
[52] U.S. Cl. ..................... 29/563; 29/38 C
[58] Field of Search ............ 29/33 P, 563, 564, 33 K, 29/149.5 C, 149.5 R, 148.4 R, 148.4 A, 57, 38 C

[56] References Cited

U.S. PATENT DOCUMENTS

| | | | |
|---|---|---|---|
| 2,222,605 | 11/1940 | Carlson | 29/33 K |
| 2,953,069 | 9/1960 | Smith | 29/38 C X |
| 4,163,313 | 8/1979 | Matsuno et al. | 29/563 |
| 4,473,930 | 10/1984 | Bezner et al. | 29/38 C |
| 4,520,595 | 6/1985 | Diener | 29/38 C X |
| 4,638,538 | 1/1987 | Kohama et al. | 29/149.5 C |

FOREIGN PATENT DOCUMENTS

| | | | |
|---|---|---|---|
| 0043584 | 6/1985 | European Pat. Off. | |
| 2804584 | 8/1979 | Fed. Rep. of Germany | 29/38 C |
| 31511 | 3/1980 | Japan | 29/564 |
| 94025 | 7/1980 | Japan | 29/148.4 A |
| 185531 | 10/1984 | Japan | 29/149.5 R |
| 887130 | 12/1981 | U.S.S.R. | 29/38 C |
| 1047594 | 10/1983 | U.S.S.R. | 29/149.5 R |
| 728938 | 4/1955 | United Kingdom . | |
| 1059771 | 2/1967 | United Kingdom . | |
| 1466039 | 3/1977 | United Kingdom . | |
| 1421087 | 7/1979 | United Kingdom . | |
| 1494173 | 2/1980 | United Kingdom . | |
| 1590111 | 5/1981 | United Kingdom . | |

*Primary Examiner*—William Briggs
*Attorney, Agent, or Firm*—Browdy and Neimark

[57] ABSTRACT

A multi-process simultaneous processing apparatus for plain bearings, comprises a rotatable table unit for index delivery. A plurality of bearing supports are mounted to the table unit in circumferentially spaced relation to one other, for accommodating respectively the plain bearings. A plurality of working units are mounted to a stationary frame at locations facing respectively the bearing supports.

2 Claims, 1 Drawing Sheet

PROCESSING APPARATUS FOR PLAIN BEARINGS

This application is a continuation of application Ser. No. 07/230,011 filed Aug. 8, 1988 abandoned.

BACKGROUND OF THE INVENTION

1. Field of the Invention

The present invention relates to a multi-process simultaneous processing apparatus for plain bearings.

2. The Prior Art

The arrangement of a conventional processing apparatus for plain bearings is such that a plurality of machines are provided for respective processes, and each pair of adjacent processes are connected to each other by a conveyer.

The conventional processing apparatus for plain bearings has the following problems:
- (a) Since each machine is large in size as compared with the plain bearings, the equipment cost is high.
- (b) Since jig bases are different from machine to machine, it takes a long time for setting. Further, setting without the use of the bases will make the jigs expensive.
- (c) Since the machines are provided respectively for the processes, and are connected to each other respectively by the conveyers, a large installation floor area or space is required.
- (d) Many troubles arise when the light-weight plain bearings located on the outside of the working jigs are delivered by the high-speed conveyers.

SUMMARY OF THE INVENTION

It is an object of the invention to provide a multi-process simultaneous processing apparatus for plain bearings, capable of eliminating the above-discussed problems of the conventional plain-bearing processing apparatus.

According to the invention, there is provided a multi-process simultaneous processing apparatus for plain bearings, comprising a rotatable table unit for index delivery, a plurality of bearing supports mounted to the table unit in circumferentially spaced relation to each other, for accommodating respectively the plain bearings, and a plurality of working units mounted to a stationary frame at locations facing respectively the bearing supports.

DETAILED DESCRIPTION OF THE PREFERRED EMBODIMENTS

Figure 1:
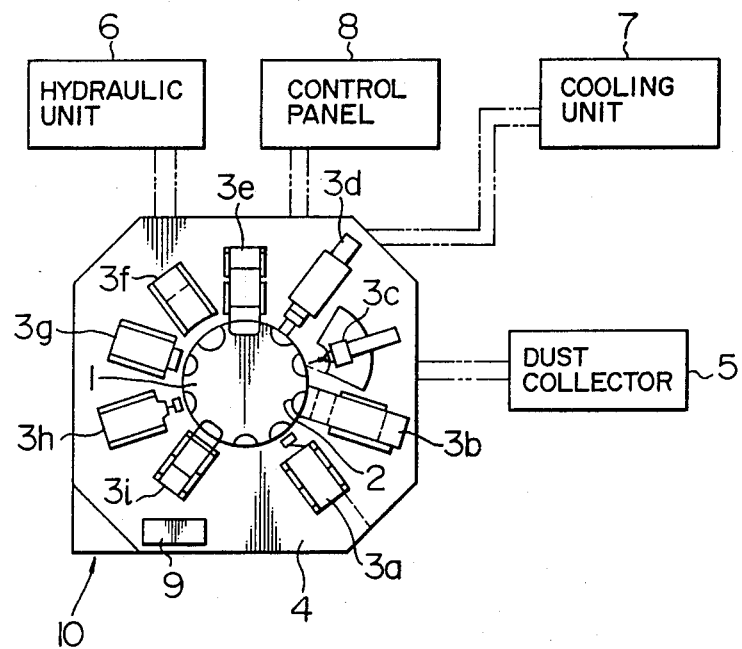
FIG. 1 is a schematic plan view of a multi-process simultaneous processing apparatus for plain bearings, according to the invention.
Figure 2:
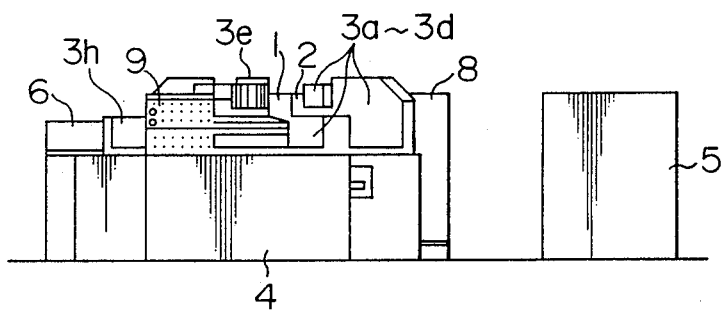
FIG. 2 is a front elevational view of the apparatus illustrated in FIG. 1.

Referring to FIGS. 1 and 2, there is shown a multi-process simultaneous processing apparatus 10 for plain bearings, according to an embodiment of the invention. The apparatus 10 comprises a rotatable circular table unit 1 for index delivery. A plurality of bearing supports 2 for accommodating therein respectively the plain bearings are mounted to the table unit 1 in circumferentially spaced relation to each other. A plurality of working units 3a through 3i are mounted to a stationary frame 4 at locations facing respectively the bearing supports 2. A dust collector 5 for drawing and discharging abatement is so arranged as to be connected to an oil groove cutting unit 3b and a bore internal chamfering unit 3c of the working units 3a through 3i. The apparatus 10 further includes a hydraulic unit 6, a cooling unit 7, a control panel 8 and an operating panel 9. In this connection, a product supply unit and a product takeout unit are not shown for simplification of illustration. The table unit 1 for index delivery is of coupling type employing, for example, a Curbic coupling, capable of being indexed at high speed and at high accuracy. The table unit 1 is rotated intermittently through a predetermined angle by an indexing mechanism (not shown). Each of the bearing supports 2 shown in FIG. 1 has such a configuration as to accommodate therein a plain bearing of half-split type having a semi-circular shape. However, each bearing support may be so modified as to accommodate therein a component having any desired configuration such as a cylindrical bearing or a bush, a semi-circular or ring-like thrust washer or the like. In addition to the oil groove cutting unit 3b and the bore internal chamfering unit 3c, the working units include a feed/claw-extending unit 3a, a height finishing unit 3d, a relief finishing unit 3e, a wall-thickness finishing unit 3f, a height/wall-thickness measuring unit 3g, a discharge unit 3h and a cup cleaner unit 3i.

In operation, as an electric power switch of the operating panel 9 is turned on and an operating button is depressed, unprocessed plain bearings are mounted respectively to the plurality of bearing supports 2 by the product supply unit (not shown), that is, in a manner of a multi-station system due to one chuck. Subsequently, the table unit 1 for index delivery is intermittently rotated by the indexing mechanism (not shown) in synchronism with respective workings at the working units. This enables a plurality of processes at the respective working units to be simultaneously carried out automatically. That is, the processes of feeding, processing, inspecting, discharging and the like are intermittently carried out automatically at a constant speed.

The apparatus according to the invention has the following advantages:
- (a) Since the entire apparatus can be reduced in size and weight, the equipment cost can be reduced.
- (b) Since the jigs (bearing supports) common to all the processes can be used, it is possible to shorten a period of time for setting.
- (c) It is possible to reduce the space required for installation of the apparatus.
- (d) After each workpiece is once clamped, it is possible to carry out operation with respect to the workpiece from the beginning to the completion of processing.
- (e) Since the size is measured within the apparatus, automatic correction is possible.
- (f) It is possible to mass-produce products easily, correctly and accurately for a short period of time, as compared with the conventional apparatus.

What is claimed is:

1. A multi-process simultaneous processing apparatus for plane bearing workpieces to be processed, comprising:

a circular rotatable indexable coupling type table unit for delivery and having a cylindrical peripheral side wall, a plurality of workpiece attachment positions on the circular table unit comprising plural recesses in said side wall; in circumferentially spaced relation to each other, and working units mounted to a stationary frame facing the workpiece attachment positions, wherein the multi-process simultaneous processing apparatus is provided for processing plain bearings as workpieces; that the table unit (1) is of the coupling type including drive means and indexing means for indexing said table; at high speed and with high accuracy; that bearing supports (2) are attached to the workpiece attachment positions for supporting plain bearings, which have the same section and the same dimensional accuracy; that the working units (3a-3i) comprise a feed/claw-extending units (3a), an oil groove cutting unit (3b), aa height finishing unit (3d), a relief bore working unit (3c), a height finishing unit (3d), a relief finishing unit (3e), a wall-thickness finishing unit (3f), a height/wall-thickness measuring unit (3g), a discharge unit (3h) and a cup cleaner unit (3i); and that also are provided a product supply unit for placing bearings in said bearing supports, a product takeout unit for removing bearings from said bearing supports, and control means for controlling the operation of said table and working units including a control panel (8) and an operating panel (9).

2. The multi-process apparatus of claim 1 wherein said table includes a coupling gear type coupling.

* * * * *